June 10, 1969     J. R. BROOKS     3,448,627

GEARLESS VARIABLE DRIVE MECHANISM

Filed May 19, 1967     Sheet 1 of 5

INVENTOR.
JERRY R. BROOKS,
BY
Berman, Davidson & Berman
ATTORNEYS.

INVENTOR.
JERRY R. BROOKS,
BY
ATTORNEYS.

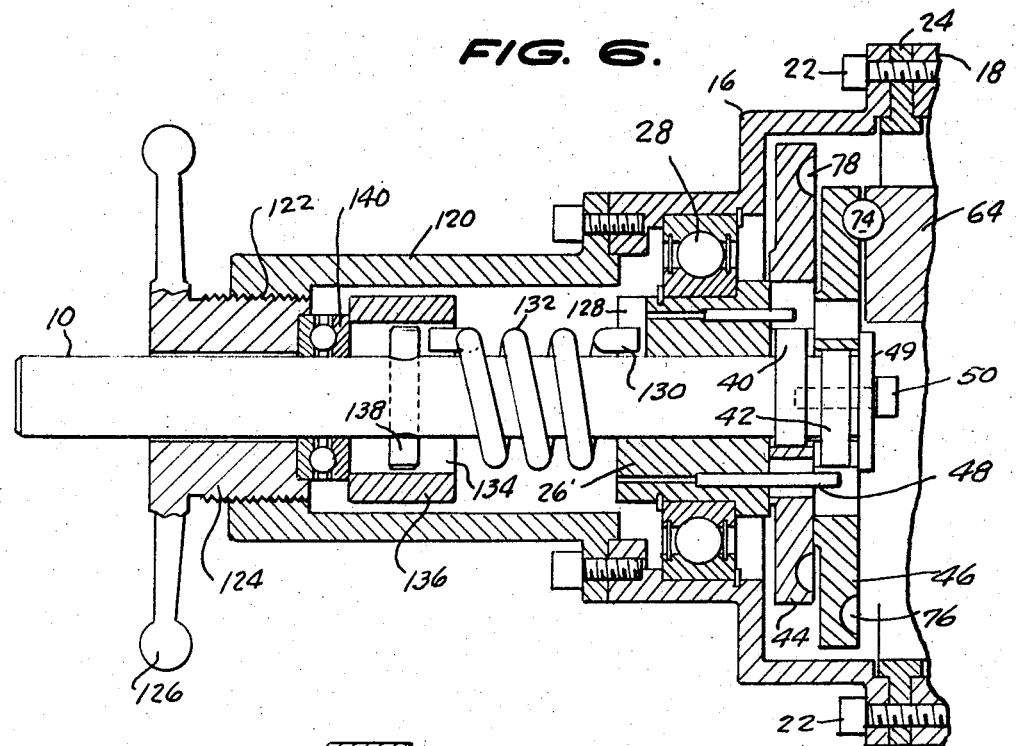
FIG. 6.
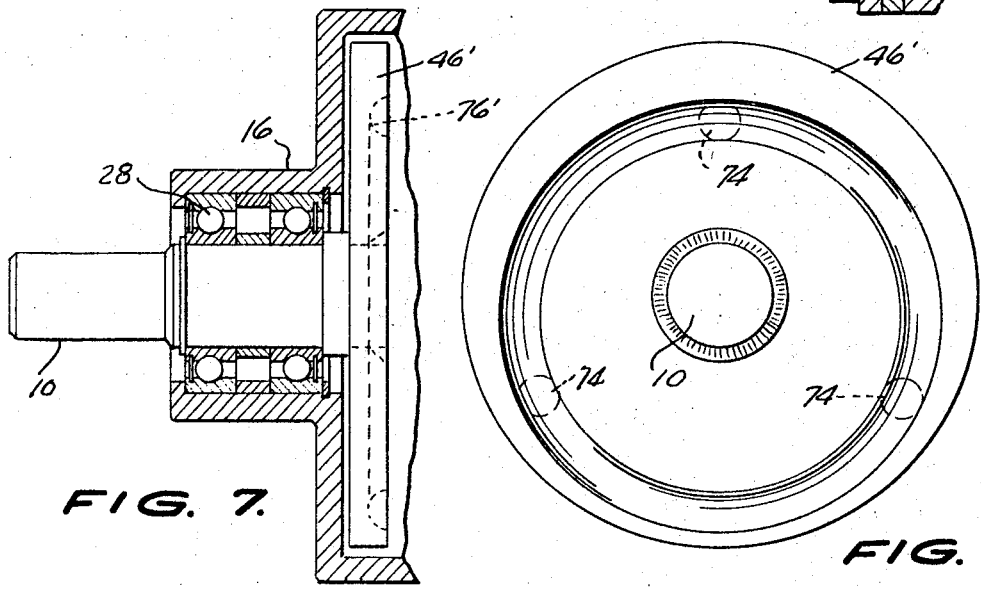
FIG. 7.
FIG. 8.
INVENTOR.
JERRY R. BROOKS,
BY
Berman, Davidson & Berman
ATTORNEYS.

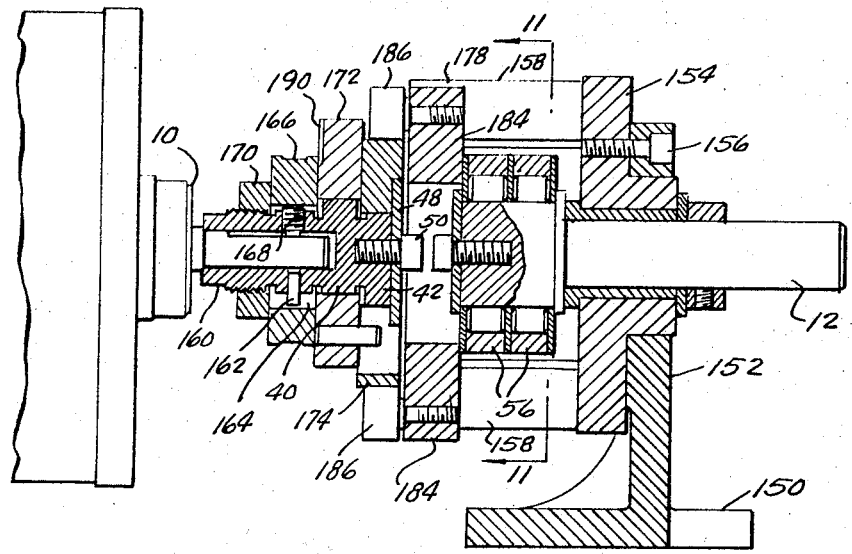
FIG. 10.
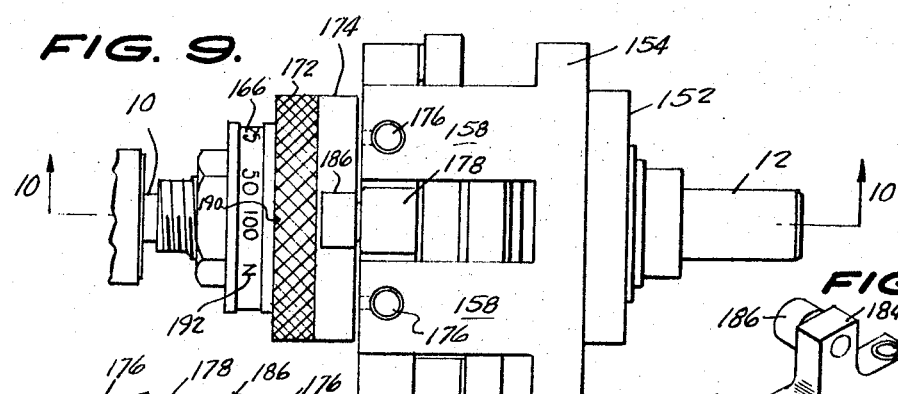
FIG. 9.
FIG. 12.
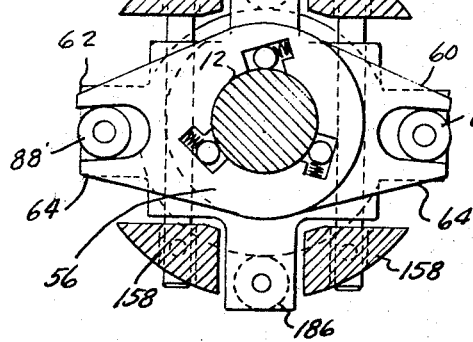
FIG. 11.
INVENTOR.
JERRY R. BROOKS,
BY
Berman, Davidson & Berman
ATTORNEYS.

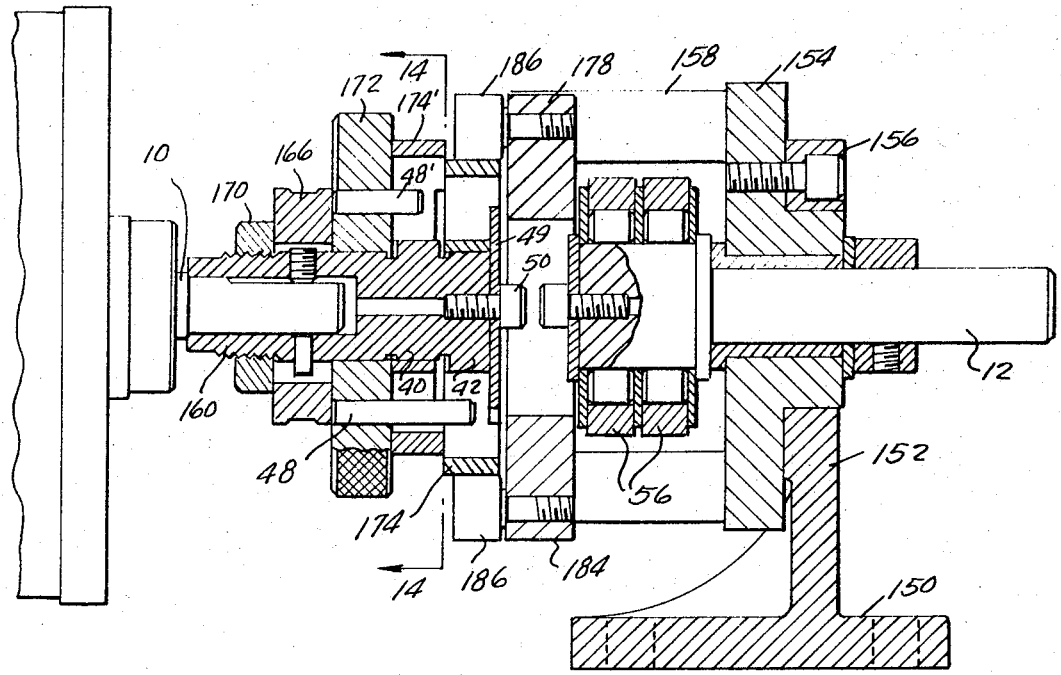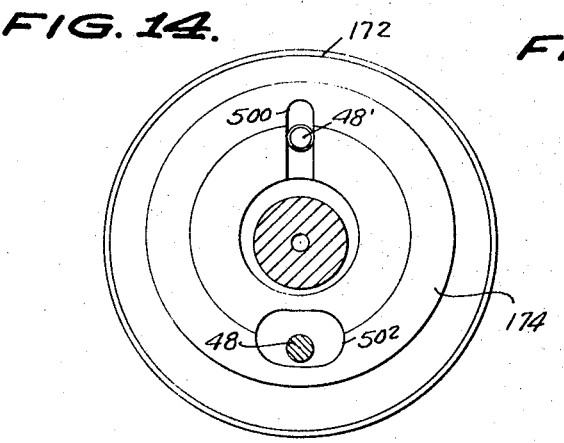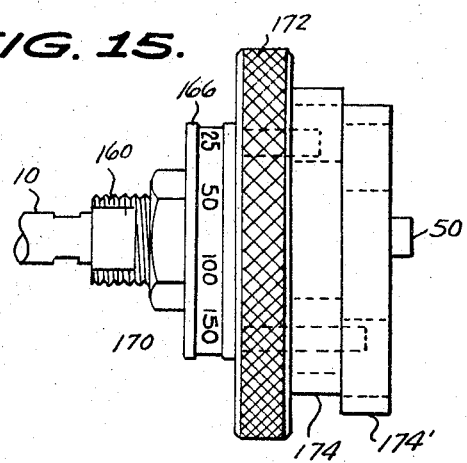

United States Patent Office 3,448,627
Patented June 10, 1969

3,448,627
GEARLESS VARIABLE DRIVE MECHANISM
Jerry R. Brooks, 1716 Merrywood Way,
Gainesville, Tex. 76240
Filed May 19, 1967, Ser. No. 639,666
Int. Cl. F16h 29/04
U.S. Cl. 74—117          10 Claims

ABSTRACT OF THE DISCLOSURE

A gearless speed reducer for connecting coaxial driving and driven shafts including a rotating disc on the drive shaft, said disc having an eccentric groove; a plurality of one-way clutches on the driven shaft; circumferentially spaced members engaging each of said clutches and engaging said eccentric groove to receive radial sliding movement therefrom, each of said clutches having cam surfaces to convert radial movement of said circumferentially spaced members into rotational movement about the driven shaft.

---

This invention relates to means for providing an r.p.m. reduction between a driving and driven shaft. It is positive in operation, yet without gears, and adjustments are provided for altering the r.p.m. ratio between driving and driven shafts.

Accordingly, it is an object of this invention to provide a speed reducer as aforesaid which is gearless, positive, adjustable as to ratio between the driving and driven shafts, and with continuous motion of the driven shaft.

It is a further object of this invention to provide a mechanism as aforesaid which requires a minimum of lubrication and servicing.

It is a further object of this invention to provide a mechanism as aforesaid in which said sliding friction is maintined and which is fully counterbalanced against vibration.

It is a further object of this invention to provide a mechanism as aforesaid which may be adapted so as automatically to adjust the r.p.m. ratio between driving and driven shafts in accordance with torque demand on the driven shaft.

It is a further object of this invention to provide a device as aforesaid which lends itself to miniaturization.

The above and other objects will be made clear from the following detailed description taken in connection with the annexed drawings, in which:

FIGURE 6 is a longitudinal cross-section showing an adaptation of the mechanism whereby the r.p.m. ratio between driving and driven shafts is automatically responsive to torque on the driven shaft;

FIGURE 7 is a cross-section through a modified construction showing a simplified form;

FIGURE 8 is an elevation taken from the right-hand side of FIGURE 7;

FIGURE 9 is a top plan view of a modified form of r.p.m. ratio adjustment;

FIGURE 10 is a section on the line 10—10 of FIGURE 9;

FIGURE 11 is a section on line 11—11 of FIGURE 10;

FIGURE 12 is a perspective view of the follower and clutch actuator of FIGURES 9–11.

FIGURE 13 is an alternative form of FIGURE 10;

FIGURE 14 is a section on the line 14—14 of FIGURE 13 and is comparable to FIGURE 3; and FIGURE 15 is an external plan view of FIGURE 13.

Figure 1:
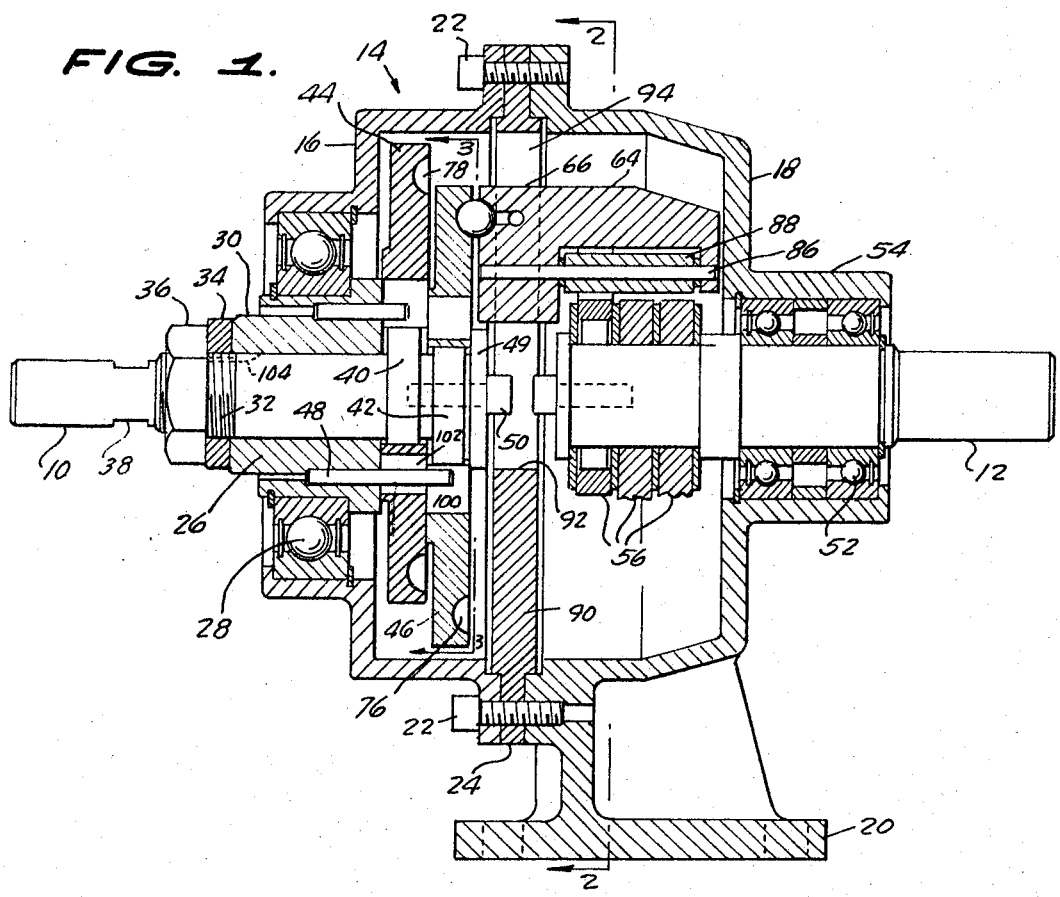
FIGURE 1 is a vertical cross-section through the mechanism as a whole.

Referring now to FIGURE 1, there is shown a driving shaft 10 and a driven shaft 12. The mechanism making up the present invention is encased in a housing generally designated 14. The housing is made up of a driving end shell 16 and a driven end shell 18. A base 20 is formed as part of the driven end shell 18. The shells 16 and 18 have mutually confronting flanges and are bolted together by bolts or cap screws 22 and between the flanges is clamped a member 24 presently to be described.

A sleeve 26 is mounted on the drive shaft 10 for rotation therewith and is journaled in ball bearings 28 mounted in the shell 16. A portion 30 of the sleeve 28 projects outside of the shell 16 and is flattened for engagement with a wrench for a purpose presently to be described. Drive shaft 10 has a threaded portion 32 engaged by an adjustment ring 34 having a lock or jam nut 36 also engaging the threads 32. The shaft 10 also has near its left-hand end in FIGURE 1 a flattened wrench-engaging portion 38.

Formed integrally with or secured to the inner end of the shaft 10 are a pair of oppositely disposed eccentrics 40 and 42. Mounted on the eccentric 40 is a circular plate 44 while mounted on the eccentric 42 is an identical circular plate 46. A pin 48 is secured in the sleeve 26 and penetrates elongated radial slots in both of the plates 44 and 46 to assure their rotation with the sleeve 26 and therefore with the shaft 10. The plates 44 and 46 are secured against axial displacement by a washer 49 which is secured by a cap screw 50 threadedly engaging the drive shaft 10, and causing both plates 44 and 46 to bear against the sleeve 26.

Figure 2:
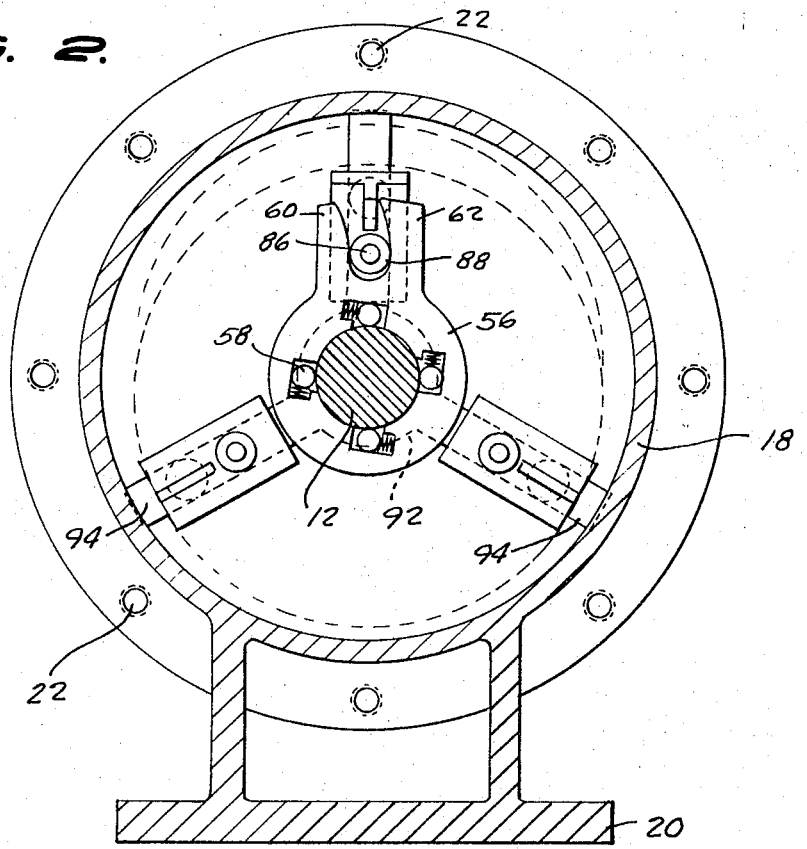
FIGURE 2 is a transverse section on the line 2—2 of FIGURE 1.

The driven shaft 12 is journaled in ball bearings 52 mounted in a boss 54 forming part of the driven housing shell 18. Mounted on the shaft 12 adjacent its inner end are a plurality of identical overrunning clutches 56, one of which is shown in detail in FIGURE 2. As shown in FIGURE 2, each of the clutches 56 has conventional shaft-engaging means 58 which effect positive engagement with the shaft 12 if the clutch is moved in one direction but which freely permit rotation if the clutch 56 moves in the opposite direction. Each of the clutches has a pair of generally radially outwardly directed arms 60 and 62. For the purpose of this disclosure, only three clutches are shown and when three are shown, the arms 60 and 62 of the several clutches are respectively spaced circumferentially 120 degrees apart. For each pair of arms 60 and 62, on a clutch 56, there is provided a special drive member or oscillator 64 which is shown in detail in FIGURE 5.

Figure 5:
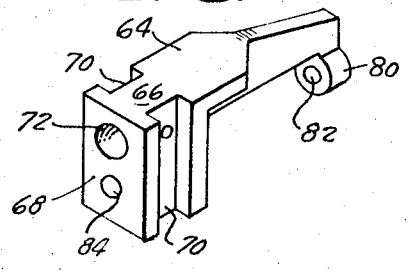
FIGURE 5 is a perspective view of an element used to connect the driving and driven shafts.

As shown in FIGURE 5, each drive member 64 has a forward rectangular portion 66 terminating in a face 68 which confronts the circular disc 46. The portion 66 also has at each side a groove 70 and in the face 68 is formed a generally hemispherical pocket 72. The pocket 72 of each member 64 receives a ball 74 which bears in a race 76 formed in the disc 46. A similar race 78 is also formed in the disc 44. The rear end of the member 64 terminates in a lug 80 having a bore 82 in alignment with a bore 84 formed in the portion 66. A pin 86 (FIGURE 1) is secured in the bores 80 and 84 and has rotatably mounted thereon a roller 88.

The member 24 previously referred to as being clamped between the shells 16 and 18 has an inner ring 90 circumferentially coextensive with the shells 14 and 18. As shown in FIGURES 1 and 2, the ring 90 has a central opening 92 and radial slots 94 which form lugs for engaging the slots 70 of the member 64 as shown in FIGURE 5. The three members 64, one for each of the clutches 56, are inserted through the central opening 92 and slid into the position indicated in FIGURE 2.

Figure 3:
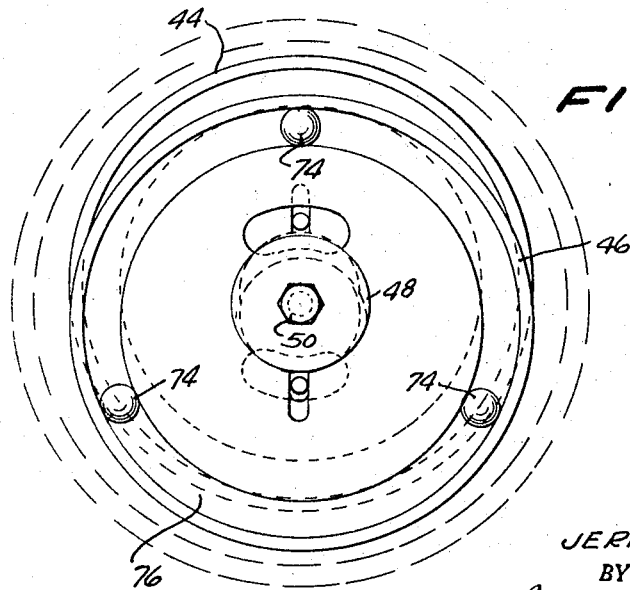
FIGURE 3 is a transverse section on the line 3—3 of FIGURE 1.

As shown in FIGURES 1 and 3, the discs 44 and 46 abut each other with disc 46 being eccentrically mounted on the eccentric 42 and the disc 44 being eccentrically mounted on the eccentric 40. The outermost disc 44 is applied as a counterbalance for the disc 46 in order to minimize vibration incident to the eccentric behavior of the disc 46. Since in all respect it is a duplicate to the disc 46, it constitutes a spare which when wear occurs in the race 76 of the disc 46, permits interchange of the discs without affecting the balance or operating characteristics of the machine. As the disc 46 and its race 76 rotate with the shaft 10, engagement between the race 76, the ball 74 and the sprockets 72 of the member 64 produce radially reciprocating movement of the member 64. This, of course, causes reciprocating movement of the rollers 88 between the radially projecting arms 60 and 62 of the clutters 56 since, as shown in FIGURE 2, the inner face of the radially projecting arm 60 is curved as is the inner face of the arm 62. The specific curvature is designed to compensate for changes in the effective radius between the roller 88 and the arms 60 and 62 as the clutch 56 rocks about the driven shaft 12. Reciprocating movement of the roller 88 produces in FIGURE 2 a counterclockwise rotation of the clutch 56 and thereupon an equal rotation of the driven shaft 12. On return or outward reciprocation of the roller 88, clockwise movement of the clutch 56 is produced but the spring and ball combination shown in FIGURE 2 permits this to occur without gripping or rotating the driven shaft 12. The three clutches 56 operate in series and therefore rotation of the driven shaft 12 is continuous.

Figure 4:
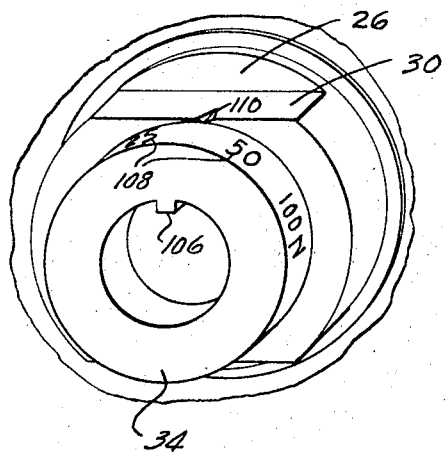
FIGURE 4 is a perspective view showing in detail part of the means for driving and driven shafts.

The means for adjusting the r.p.m. ratio between the drive shaft 10 and the driven shaft 12 will now be explained with particular reference to FIGURES 1 and 4. As previously noted, pin 48 is secured in the sleeve 26 and plays in slots 100 and 102, respectively, formed in the discs 46 and 44. The eccentrics 40 and 42, however, are fixed relative to the drive shaft 10. A keyway 104 is cut in the drive shaft 10 adjacent the adjusting ring 34. Now, in order to adjust the ratio between the shaft 10 and the shaft 12, the jam nut 36 is backed off. A wrench is engaged with the flattened portion 38 on the shaft 10 and another wrench is engaged with the flattened portion 30 of the sleeve 26. The adjusting ring 34 has a key 106 formed on its inner periphery and engaging the keyway 104, while the exterior of the ring 34 carries adjustment indicia indicated at 108 in FIGURE 4.

A marker 110 is formed in the surface 30 of the sleeve 26. The shaft 10 is then turned relative to the sleeve 26, the extent of the turning being indicated by indicia 108 on marker 110. When the eccentricity of eccentrics 40 and 42 exactly match the eccentricity of the discs 44 and 46, the parts will be at a neutral or zero point and rotation of the shaft 10 will not result in any rotation of the shaft 12. When the eccentricity of the eccentrics 40 and 42 become cumulative with the eccentricity of the discs 44 and 46, then the ratio between r.p.m. of shaft 10 and that of shaft 12 is at minimum. When the desired adjustment is reached, it is only necessary to use a wrench to restrain the shaft 10 and bring the jam nut 36 into tight engagement with the ring 34.

FIGURE 6 shows a modification used to make the ratio between the drive shaft 10 and the driven shaft variable in response to torque load on the driven shaft 12. The shaft 12 does not appear in FIGURE 6. Reference numerals in FIGURE 6 are the same as those in FIGURES 1–5 insofar as the parts are identical. In FIGURE 6, a sleeve 26' replaces the sleeve 26 in FIGURE 1 and is carried in bearings 28 in the shell 16. An extensor sleeve 120 is bolted to the shell 16 and has at its free end interior threads 122. Threads 122 engage mating threads on the hub 124 of an adjusting wheel 126. The drive shaft 10 passes freely through the hub 124, the extensor 120 and the sleeve 26' and terminates in the previously discussed eccentrics 40 and 42 which carry the previously discussed discs 44 and 46. The discs are secured in abutting relationship in the sleeve 26' by a washer 49 and cap screw 50, as in FIGURE 1, and are secured to rotate with the sleeve 26' by a pin 48 as in FIGURE 1.

The sleeve 26' has a slot 128 formed at its outer end which receives the end 130 of a spring 132. The opposite end of the spring 132 freely engages a slot 134 in a sleeve 136 slidably mounted on the shaft 10. A pin 138 has a press fit in the shaft 10 and also engages in the slot 134. An anti-friction thrust bearing 140 lies between and engages both the hub 124 and the sleeve 136.

Now, with constant torque and r.p.m. applied to the drive shaft 10 and any sort of load on the driven shaft 12, the initial effect will be to increase tension in the spring 132 and thereby to increase force exerted to turn the sleeve 26' and its associated parts. If the resistance in the matter of torque on the driven shaft 12 is too great, eccentrics 40 and 42 will adjust themselves within the discs 44 and 46 toward the neutral point which is the point of maximum torque on driven shaft 12. When the proper ratio is reached, the discs 44 and 46 begin to rotate and thereby to turn the driven shaft 12 through the clutches 56. The wheel 126 is normally stationary and may be used during operation to increase the tension of spring 132 and thereby further to increase the r.p.m. ratio between shafts 10 and 12. Incidentally, this construction provides an automatic overload safety feature in that undue resistance to rotation of the driven shaft 12 will bring the eccentrics and their associated discs to the neutral point at which point the shaft 10 may rotate freely without exerting any effort on the driven shaft 12.

FIGURES 7 and 8 illustrate the degree to which the construction may be simplified if, for whatever reason, it is not desired to adjust the ratios of the driving and driven shafts. In this case, the drive shaft 10 simply is mounted in bearings 28' in the shell 16 without interposition of a sleeve. A disc 46' has an eccentric raceway to receive ball 74 and the disc 46' is welded or otherwise suitably secured directly to the shaft 10. Since the disc 46' has been put in dynamic balance by conventional means, additional compensation devices are not required.

FIGURES 9–12 show an alternative structure in which only two clutches are involved. Here again, the drive shaft is 10 and the driven shaft 12. The clutches are designated 56 and each clutch 56 has arms 60 and 62, respectively, embracing rollers 88 and 88' precisely as in FIGURES 1 and 3. In FIGURE 10 there is shown a base member 150 from which rises a column 152 with a spider disc 154 secured to the column 152 by cap screws 156. A plurality of spaced arms 158 extend horizontally from the spider disc 154.

As best shown in FIGURE 10, the drive shaft 10 enters a bore in a sleeve 160 having at its inner ends opposed eccentrics 40 and 42 precisely similar to the eccentrics of the same reference numeral appearing in FIGURE 1. The sleeve 160 has mounted therein a pin 162 which is slidable in a groove 164 in an indicator wheel 166 which is freely slidable on the sleeve 160. A set screw 168 in the sleeve 160 engages a flat on the drive shaft 10. A jam nut 170 has threaded engagement with the sleeve 160 and bears against the indicator wheel 166. A knurled eccentric 172 has an eccentric bore which surrounds the eccentric 40, while a similar eccentric 174 surrounds the eccentric 42, the assembly being held in place by a disc 48 and cap screw 50, as in FIGURE 1. Pairs of members 158 on opposite sides of the driven shaft 12 are penetrated by guide pins 176.

Since only two clutches 56 are involved, it is not necessary to provide individual followers 64 as was done in the case of the three clutches 56 in FIGURE 1. Accordingly, instead of the three followers 64, as provided in FIGURE 1, a single follower 178 is provided for operating both of the clutches 56. The nature of the follower 178 will best be understood by reference to FIGURE 12. The follower 178 is made out of a single piece of metal which may have a central elongated bore 180, through the driven shaft 12 or its associated parts may pass. It is drilled vertically at 182, and through the bores the pins 176 slidably pass. Upright bosses 184 are formed at top and bottom of member 178 and rotatably mounted in these bosses are followers 186 which bear on the eccentric 174. Horizontal bosses 188 and 190 are also formed on the member 178. A clutch-operating roller 88 is rotatably mounted on the boss 190 closely adjacent thereto while a similar roller 88' is formed on the boss 188 and is spaced therefrom by a shaft or stud 192, a distance sufficient to clear the first of the clutches 56. Since the rollers 88 and 88' are on opposite sides of the driven shaft 12 and are connected to independent clutches, each downstroke advances one clutch and detracts the other, while the upstroke precisely reverses this cycle.

Adjustment of ratio between shafts 10 and 12 is accomplished very much as was the case in FIGURE 1. The jam nut 170 is backed off on the sleeve 160 and the eccentric 172 is turned by its knurled exterior to bring its marker 190 to the desired point on the indicia 192 carried by the indicator wheel 166. This adjusts the eccentrics 40 and 42 within the eccentric bores of discs 172 and 174, as previously described with reference to FIGURE 1. When the desired adjustment is attained, jam nut 170 is tightened against the indicator wheel 166 to lock the parts in adjusted position. A wrench flat (not shown) is provided on the left-hand end of sleeve 160 to permit tightening of the jam nut 170 without altering the setting.

The forms heretofore discussed are perfectly satisfactory if the r.p.m. of the input shaft is not too great, and if the adjusted eccentricity of the eccentric means is not too eccentric. When, however, there is a combination of high r.p.m. on the input shaft and maximum eccentricity, there is a tendency to produce excessive vibration. The forms of FIGURES 13, 14 and 15 may be used to overcome or avoid this tendency. There is no operational difference between the form of these figures and those of FIGURES 1 and 9, and in general identical reference numerals, as used in FIGURES 9–12 are applied in FIGURES 13–15. For example, FIGURE 13 should be compared with FIGURE 10; FIGURE 15 should be compared with FIGURE 9; and FIGURE 14 should be compared with FIGURE 3.

Briefly comparing FIGURES 10 and 13, it will be seen that the latter differs from the former by the addition of a pin 48' diametrically opposite pin 48. There has also been added an eccentric 174' identical to the eccentric 174 and the eccentric 174' bears on the eccentric 42 which in FIGURE 10 carries the member 172. The eccentric 174 bears on eccentric 42. The pin 48' enters a narrow slot 500 in eccentric 174, while the pin 48 enters a large aperture in 174. Precisely, the reverse is true of eccentric 174'. The effect, when knurled wheel 172 is rotated relative to eccentrics 40 and 42, is to maintain the members 174 and 174' in diametrically opposed relationship and of equal eccenricity, thereby assuring perfect balance at all adjustments.

While certain specific details have been disclosed herein, it is not intended to limit this invention to these precise details. For example, the simplified structure of FIGURES 7 and 8 could be substituted in either FIGURE 1 or FIGURE 9, and no doubt other alterations in detail would occur to anyone skilled in the art. It is intended, therefore, that this invention be limited only as set forth in the subjoined claims.

What is claimed is:
1. A gearless reduction mechanism for connecting driving and driven shafts with said shafts coaxial comprising: at least one one-way clutch for connection to a driven shaft; an eccentric for connection to a drive shaft; a reciprocating follower for said eccentric and means connecting said follower and said clutch to oscillate said clutch upon each reciprocation of said follower.

2. A mechanism as set forth in claim 1, including a plurality of clutches and a plurality of followers, said clutches and said followers being uniformly spaced peripherally about said driven shaft.

3. A mechanism as set forth in claim 1, including means interposed between said drive shaft and said eccentric for adjusting the ratio of r.p.m. between the drive shaft and the driven shaft.

4. A mechanism as set forth in claim 3, in which said interposed means are automatically responsive to changes in torque demand in said driven shaft.

5. A mechanism as set forth in claim 4, including manually operable means to adjust said automatically responsive means.

6. A gearless reduction mechanism for connecting driving and driven shafts comprising: at least two one-way clutches for connection to a driven shaft; an eccentric for connection to the driving shaft; single, reciprocating follower for said eccentric; and means connecting said follower to each of said clutches to oscillate said clutches on each reciprocation of said follower.

7. A gearless reduction mechanism for connecting driving and driven shafts comprising: at least one one-way clutch for connection to a driven shaft; an eccentric for connection to a drive shaft; a reciprocating follower for said eccentric; means connecting said follower and said clutch to oscillate said clutch upon each reciprocation of said follower; means interposed between said drive shaft and said eccentric for adjusting the ratio of r.p.m. between the drive shaft and the driven shaft, said interposed means including a first member eccentric to said drive shaft; a second member having an eccentric bore, which bore surrounds the first member, said interposed means operating to adjust the combined eccentricity of both members relative to said drive shaft.

8. A mechanism as set forth in claim 7, in which said interposed means are automatically responsive to changes in torque demand on said driven shaft.

9. A mechanism as set forth in claim 7, including a second pair of members of opposite eccentricity to said first pair, both pairs being simultaneously adjustable by said interposed means.

10. A mechanism as set forth in claim 9, in which said interposed means are automatically responsive to changes in torque demand on said driven shaft.

References Cited

UNITED STATES PATENTS

| | | | |
|---|---|---|---|
| 1,780,423 | 11/1930 | Hallett | 74—117 |
| 1,787,289 | 12/1930 | Thomas | 74—117 |
| 1,945,702 | 2/1934 | Pitter | 74—117 |
| 2,186,395 | 1/1940 | Staude | 74—117 |
| 2,521,711 | 9/1950 | Galliano | 74—117 |
| 3,340,743 | 9/1967 | Stageberg | 74—116 |

FRED C. MATTERN, JR., *Primary Examiner.*

W. S. RATLIFF, JR., *Assistant Examiner.*

U.S. Cl. X.R.

74—125.5